No. 774,427. PATENTED NOV. 8, 1904.
E. G. HOFFMANN.
BALL BEARING.
APPLICATION FILED JAN. 21, 1903.
NO MODEL.

Attest:
A. N. Jesbera.
M. A. Brayley.

Inventor:
Ernst Gustav Hoffmann
by Redding, Kiddle & Greeley
Attys.

No. 774,427. Patented November 8, 1904.

UNITED STATES PATENT OFFICE.

ERNST GUSTAV HOFFMANN, OF CHELMSFORD, ENGLAND.

BALL-BEARING.

SPECIFICATION forming part of Letters Patent No. 774,427, dated November 8, 1904.

Application filed January 21, 1903. Serial No. 139,887. (No model.)

*To all whom it may concern:*

Be it known that I, ERNST GUSTAV HOFFMANN, a subject of His Majesty the German Emperor, residing at Chelmsford, in the county of Essex, England, have invented a certain new and useful Improvement in Ball-Bearings, of which the following is a specification.

This invention relates to improvements in ball-bearings of the non-adjustable two-point type which is at present in favor for supporting rotating shafting or the like or for a part rotating around a fixed shaft consisting of a collar (which may form the cone portion) fixed to the shaft and having on its exterior a ball-track and surrounding the same a further collar which may form the cup portion, having in its interior a similar track for a row of balls which bear at one point of each track only, the points of contact of the balls being in all cases in planes at right angles with the axis of the shaft or, in other words, in which the axes of rotation of the balls are parallel to the axis of the shaft.

In order that the balls may bear at two points only in planes at right angles with the axis of the shaft, it is necessary to provide special means for getting them in position and removing them, and it is also desirable to provide for sufficient relative movement of one part of the bearing relative to the other to prevent binding or wedging under ordinary conditions of use.

It is the object of my invention to so construct the bearings as to avoid binding or wedging of the balls; and with this object in view my invention consists in the construction hereinafter described and shown, in which either the cone or cup is provided with a cylindrical bearing-surface and shoulders so arranged that they are not normally in contact with the balls.

Figure 1:
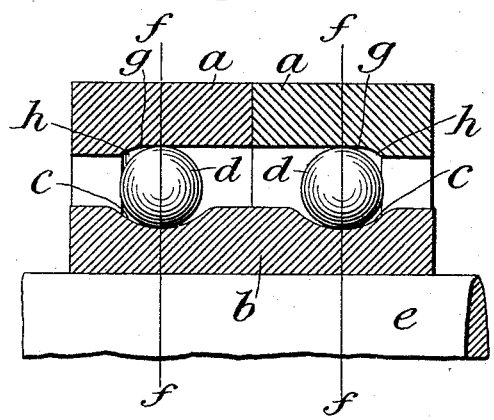
Figure 2:
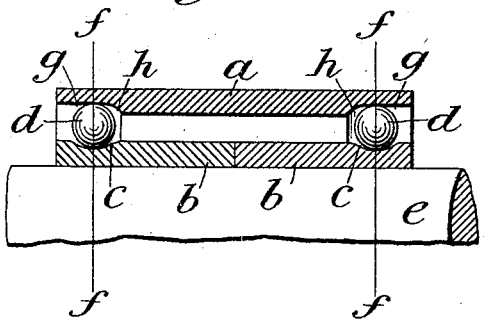

In the accompanying drawings, Figure 1 is a sectional view of one half of a bearing, showing the shoulders outside the balls; and Fig. 2 is a similar view showing the shoulders between the balls.

Referring to the drawings, $a\ a$ represent the cup or ring, shown in Fig. 1 as divided transversely of the shaft, so as to permit of the removal of one of the parts to insert or remove the balls, and shown in Fig. 2 as solid.

$b\ b$ represent the cone provided with grooves $c\ c$ for the balls $d$, the grooves being of such width and contour that the balls contact with them at one point only.

$e$ is the shaft on which the cone $b\ b$ is mounted.

The cone is shown in Fig. 2 divided transversely of the shaft and in Fig. 1 is shown solid.

Two rows of balls are employed in the bearing shown, each of the balls of each row bearing on the parts $a$ and $b$ on two points only, these points lying in the planes indicated by the lines $f\ f$. The parts of the cup or ring $a\ a$ of Fig. 1 are formed with interior cylindrical bearing-surfaces $g\ g$ for the balls, on which the balls bear at one point only, and with shoulders $h\ h$ on the outside of the track, which though not normally in contact with the balls will at times bear on their outsides for taking up end thrusts or holding the shaft in longitudinal position. In the construction shown in Fig. 2 the shoulders $h\ h$ are between the balls, and, as in the construction shown in Fig. 1, these shoulders are not normally in contact with the balls.

By reason of the fact that the shoulders are not in contact with the balls under normal conditions the rotation of the balls on axes parallel with the axis of the shaft is not interfered with, as would be the case if the shoulders were in contact with them. Thus a true two-point bearing is secured. It will of course be understood that the space between the balls and the shoulders may be so slight as to be hardly perceptible and would not be as great as is indicated in the drawings, in which for the sake of clearly showing the shoulders not in contact with the balls the space between them is shown much greater than it would be in actual construction of bearings embodying my invention. It will, however, be understood that my invention is applicable only and is confined to non-adjustable two-point bearings in which the contact-points are in planes at right angles to the axis of the shaft and does not apply to three or four point constructions in which the contact-points are in planes at angles oblique to the axis of the shaft.

Having thus described my invention, what I claim, and desire to secure by Letters Patent, is—

A two-point ball-bearing in which the axes of rotation of the balls are parallel with the axis of the shaft, comprising a cone portion having a groove in which the balls travel on one point only, and a cup portion having an interior cylindrical bearing-surface on which the balls bear at one point only, and having also a shoulder at one side of said cylindrical bearing-surface not normally in contact with the balls; substantially as described.

In testimony whereof I have hereunto set my hand in the presence of two subscribing witnesses.

ERNST GUSTAV HOFFMANN.

Witnesses:
ALLEN PARRY JONES,
EDWARD TRAMP FOSTER.